Dec. 2, 1958     R. C. FERGASON     2,862,342
COTTON HARVESTER WITH SPECIFIC CONVEYING
AND RECEPTACLE STRUCTURE
Filed June 21, 1956     3 Sheets-Sheet 1

Inventor
Rector L. Fergason
By Donald C. McGaughey
Attorney

Dec. 2, 1958  R. C. FERGASON  2,862,342
COTTON HARVESTER WITH SPECIFIC CONVEYING
AND RECEPTACLE STRUCTURE
Filed June 21, 1956  3 Sheets-Sheet 2

Inventor
Rector C. Fergason
By Donald C. McGaughey
Attorney

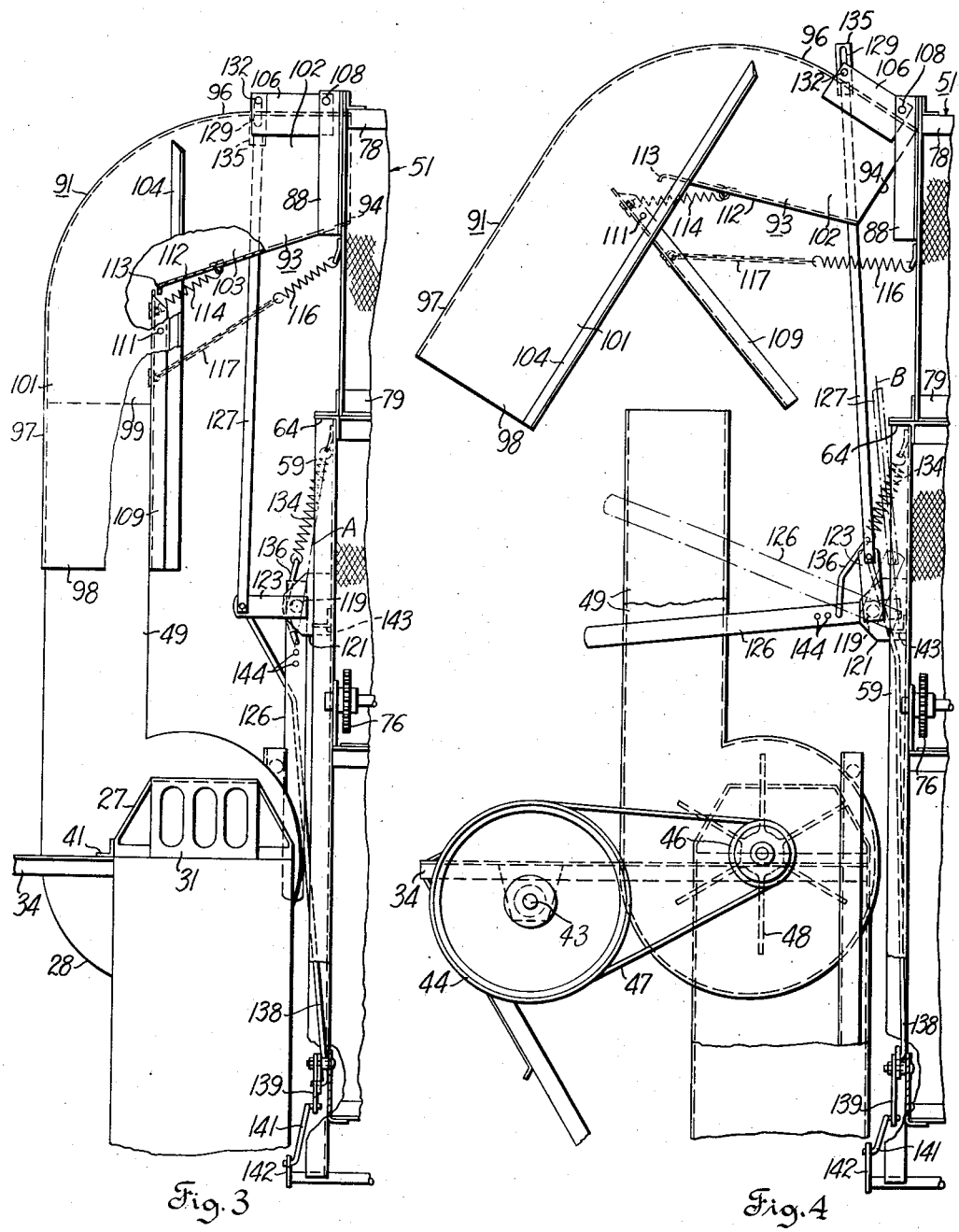

United States Patent Office 2,862,342
Patented Dec. 2, 1958

2,862,342

COTTON HARVESTER WITH SPECIFIC CONVEY-
ING AND RECEPTACLE STRUCTURE

Rector C. Fergason, Gadsden, Ala., assignor to Allis-
Chalmers Manufacturing Company, Milwaukee, Wis.

Application June 21, 1956, Serial No. 592,812

18 Claims. (Cl. 56—12)

This invention relates to harvesting machines, and it is concerned more particularly with a crop gathering and storing type of harvesting machine, such as a cotton harvester, which has a harvesting unit for taking the crop from the field, a receptacle in which the harvested material is stored temporarily during the harvesting operation, and a conveying mechanism for passing the harvested material from the harvesting unit to the receptacle.

Cotton harvesting machines have heretofore been known which utilize a pneumatic conveying system for elevating harvested material from the harvesting unit to the receptacle. In some types of these machines the unloading of the receptacle is accomplished by elevating and tilting the receptacle, thereby facilitating discharge into an awaiting wagon or truck. Harvesters unloading in this manner require a separable connection in the conveying system at some point between the harvesting unit and receptacle in order to accommodate the wide displacement which occurs between these units during elevation to an unloading position.

It is desirable, in harvesters of the above outlined type, that this separable connection between the harvesting unit and receptacle be constructed to meet a number of requirements, among which are: quick separation in response to actuation of a control mechanism for the separable connection preparatory to unloading movement of the receptacle; close fitting coupling between the adjoining parts of the separable connection to minimize loss of air pressure and conveyed material; positive retention of the separable connection in both open and closed positions, for purposes of operator safety when in an open position and to prevent loss of conveyed material during operation; self-adjustment so that the connection may follow all normal movements of a floating harvesting unit during operation; automatic control to prevent elevation of the receptacle to an unloading position prior to separation of the conveying structure to an open position; low manufacturing costs; and simple dependable operation.

Generally, it is an object of the invention to provide an improved harvesting machine of the hereinabove outlined character, including a separable connection for a conveying system which meets all of the above listed requirements in a fully satisfactory manner.

More specifically, it is an object of the invention to provide an improved separable connection which lends itself to installation on a harvesting machine in a position readily accessible for operation by the operator.

With the foregoing objects in mind the invention contemplates the provision of a guide duct mounted on the harvester in communication with the receptacle for movement to an open nonconveying position when the harvester is unloading, and to a closed material conveying position during the harvesting operation.

A further object of the invention is to provide a guide duct actuating mechanism which is operable with only a slight application of lifting force by the operator and which will automatically lock the guide duct in either an open or a closed position.

Another object of the invention is to provide a guide duct actuating mechanism of the above outlined character which lends itself to use for controlling a plurality of harvested material guide ducts, and by means of which raising and lowering of a plurality of ducts may be effected without any increase of lifting force by the operator.

These and other objects and advantages are obtained by the present invention, various novel features of which will be apparent from the following decription and drawings disclosing an embodiment of the invention, and will be more particularly pointed out in the appended claims.

Referring to the drawings:

Fig. 3 is an enlarged partial side view of the cotton harvester shown in Fig. 2 with parts broken away and shown in section, and showing the conveying structure in one position of adjustment;

Fig. 4 is a partial side view of the cotton harvester shown in Fig. 3 with parts broken away and shown in section, and showing the conveying structure in another position of adjustment.

Figure 1:
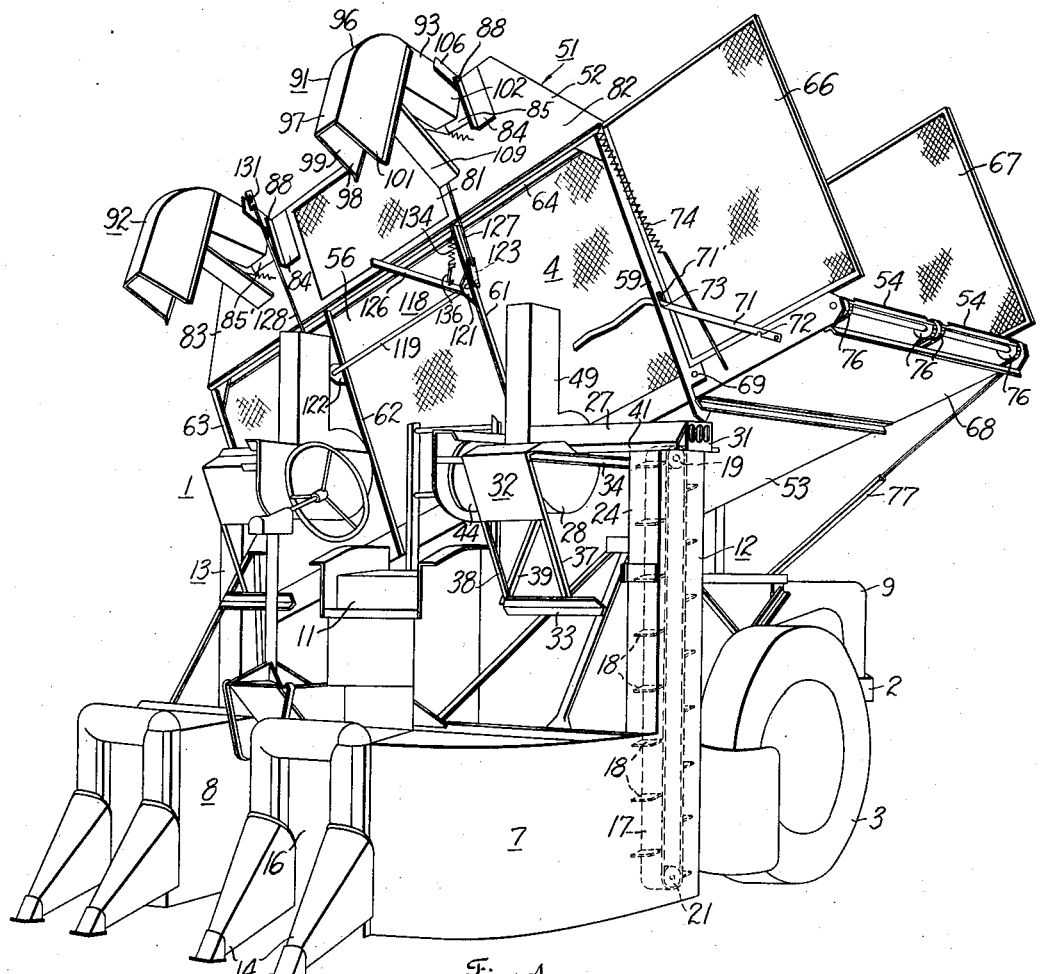
Fig. 1 is a perspective view of a cotton harvester including a tiltable cotton receiving receptacle embodying the invention of the subject case.
Figure 2:
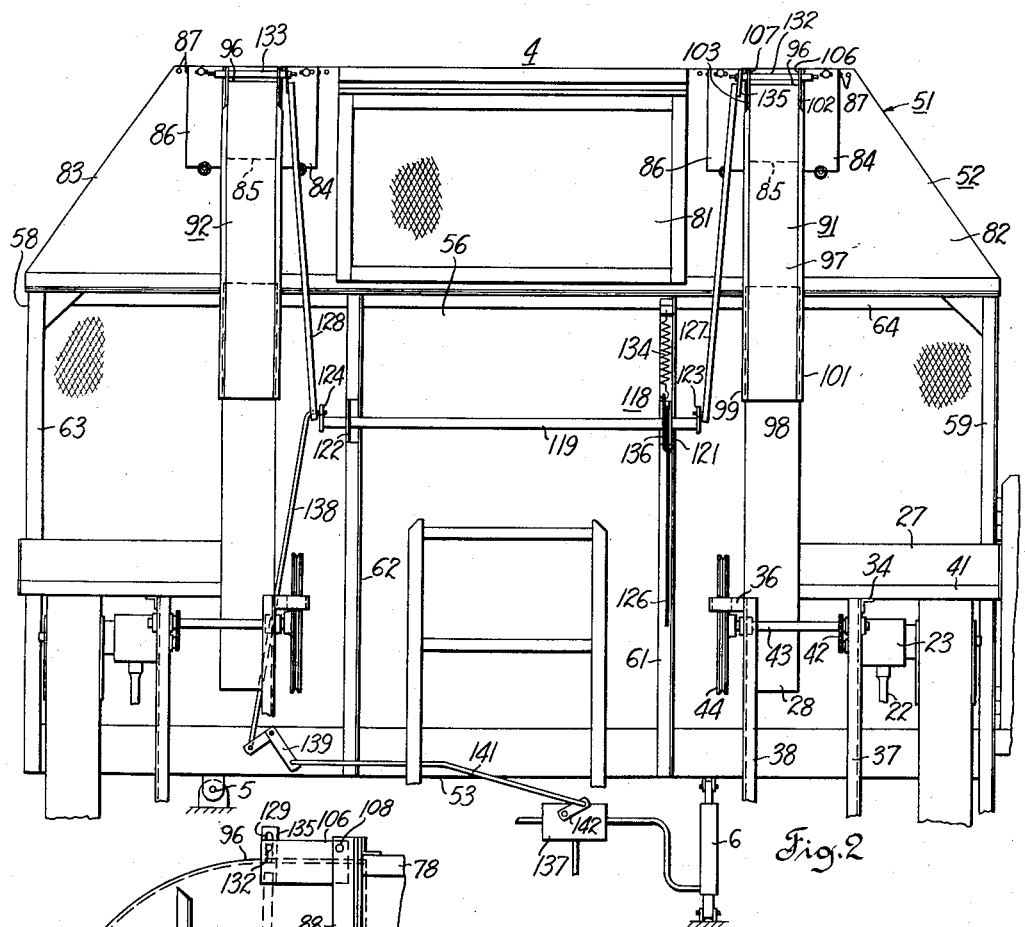
Fig. 2 is a partial front view of the cotton harvester shown in Fig. 1.

Referring to Fig. 1, the reference character 1 designates a cotton harvester having a mobile support 2 carried by a pair of drive wheels 3 and a dirigible front wheel (not shown). A harvested material receiving receptacle or basket 4 is pivotally mounted as by hinge 5 (Fig. 2) on the mobile support 2 for selective adjustment to a tilted unloading position, as shown in Fig. 1, and to lowered material loading position as shown in Fig. 2. The harvester is provided with a conventional hydraulic system including a hydraulic pump (not shown) which is selectively operable to actuate a ram 6 (Fig. 2) to elevate the basket 4 or to actuate a second ram (not shown) for raising and lowering a pair of harvesting units 7 and 8 mounted on a forward portion of the mobile support 2. As the suspension system for the harvesting units 7 and 8 forms no part of the present invention, further discussion thereof is believed to be unnecessary, it being sufficient for an understanding of the present invention to know that the harvesting units are mounted for up and down vertical movement to raised and lowered positions.

The harvester is driven by a conventional engine 9 mounted on a rear portion of the mobile support 2. An operator's station 11 is mounted just forwardly of the basket 4, and it will be understood that the ususal steering, brake, clutch and hydraulic control levers are mounted in convenient proximity thereto.

The cotton harvesting units 7, 8 and the conveying structures 12 and 13 for each are of identical construction, differing only in that they are of opposite hand, that is, they are constructed for right and left hand installation. Therefore, only the right hand unit 7 and conveying structure 12, as seen with reference to Fig. 1, will be described in detail. The unit 7 has a suitable rigid frame structure (not shown) enclosed by a sheet metal covering. The unit is further provided with a pair of sheet metal divider points 14 located on a forward part of the unit. In operation the divider points serve to guide the cotton plants into the picking tunnel 16 where the cotton is removed from the plants and presented in elevating relation to an endless belt type conveyer 17 having cotton carrying flights 18 thereon. The conveyor belt is trained about upper drive pulley 19 (Fig. 3) and a lower idler pulley 21. Power for pulley 19 is provided by a suitable power take-off shaft 22 (Fig. 2) associated with a gear box 23. A sheet metal housing 24 is supported by the unit 7 and encloses the endless belt 17. The housing 24 extends upward to a point approximately equal with the top of the endless conveyor 17 and pulley 19 where it merges with a lateral cotton feeder main 27, having one end connected with the air intake of a blower 28. The other end of the feeder main 27 adjacent housing 24 is open to provide an air intake on a side of conveyer 17 and is remote from blower 28. A suitable grill 31 is provided for the air intake to prevent the entrance of foreign material such as sticks and the like.

The blower assembly 28 is supported by a unit frame structure 32 carried by an A-frame 33 mounted on the picking unit 7. The unit frame structure includes a pair of spaced longitudinally extending channel members 34 and 36 (Fig. 2). The channel members are rigidly supported by a series of diagonal braces 37, 38 and 39 (Fig. 1), which depend therefrom and which are mounted on the A-frame 33. The blower is supported by suitable supports including a bracket 41 mounted between the channel members 34 and 36. Driving power for the blower is provided by a power transmitting means including chain 42 operatively trained about a driving sprocket on gear box 23 and a driven sprocket on a shaft 43. A driving sheave 44 (Fig. 4) is mounted on the other end of shaft 43 and drivenly connected with the impeller sheave 46 by a conventional V-belt 47.

In operation the cotton harvested by the unit 7 is picked up and elevated by the endless conveyor 17 to the feeder main 27. The main has a discharge aperture opening into the air intake of blower 28. As the blower impeller 48 (Fig. 2) is driven it draws air in through the feeder main 27 by a suction action. The inflowing air, in passing over the top of pulley 19 and the endless belt 17, picks up the cotton from conveyor flights 18 and carries it through the main 27 into the blower 28 from which it is discharged through a tangentially located conveyor spout 49.

It will be understood that the harvesting unit and associated elevating structure above described for the right side of the harvester, as shown in Fig. 1, is duplicated on the left side of the harvester.

As above described, the basket 4 is pivotally mounted by means of hinge brackets 5 on the mobile support and elevated by the expansion of ram 6. The basket 4 comprises a box like structure enclosed at its top by a cover 51. The basket 4 includes a bottom wall or floor 53 which mounts a raddle type endless conveyor 54 for aiding in discharge of the cotton. Three of the four vertical sides of the basket 4 are formed by front and side walls 56 and 58 and a rear wall (not shown), all of generally rectangular shape. The frame work for the wall members is constructed of angle irons, and as shown in Fig. 2, the front wall includes a vertically extending series of four angle irons 59, 61, 62 and 63, rigidly secured to the bottom wall 53 and connected at their free or top ends by a horizontally extending angle iron 64. The other vertical side members are similarly constructed and all three of the vertical sides are covered with a cotton retaining wire mesh attached to the angle irons. The fourth vertical side or discharge opening of the basket 4 is closed by a pair of doors or end gates 66 and 67 which are pivotally mounted on the front and rear wall members.

A floor or end extension 68 is pivotally hinged on an axis 69 extending parallel to the basket bottom wall 53 adjacent the bottom edge of the basket discharge opening and in underlying relation to the basket doors 66 and 67. An end extension control arm 71 is pivotally mounted on each side of the end extension 68, only the near side arm appearing in Fig. 1. The arms extend diagonally upward through suitable slots 71' in the basket frame angle irons and each is provided with a pair of notches 72 and 73 which cooperate with the slots 71' to latch the end extension 68 in either a closed position wherein the extension is folded up against the basket doors 66 and 67 and in an open position in which the extension 68 is in alignmennt with the bottom wall 53. A pair of counterbalancing springs 74 (Fig. 1), only one of which is shown, are connected to spaced upper portions of the basket 4 and to opposite sides of the end extension 68. When the extension 68 is lowered, these springs are tensioned or loaded and act to reduce the force required to return the floor extension 68 to its raised or folded transport position. It will be understood that the raddle conveyor 54, associated with the floor member 53, is also operatively trained about sprockets 76 carried by the end extension 68. Power for driving the raddle conveyer during unloading is provided by a telescoping power take-off shaft 77 (Fig. 1).

The basket cover 51 includes front and rear trapezoidal shaped members 52, only the front member shown. A suitable stiffening framework of angle irons 78 and 79 (Figs. 3 and 4) interconnects the front and rear members 52, and a cotton retaining material such as wire mesh is secured to the framework. The cover 51 is rigidly secured in closing relation to the top of the basket 4 as by bolting. The front member 52 includes a center panel 81 of wire mesh and a pair of side panels 82 and 83 formed of sheet metal. Each side panel includes a harvested material inlet aperture identified by the reference characters 85 and 85' respectively (Fig. 1). A pair of masking elements 84 and 86 (Fig. 2) are adjustably mounted on opposite sides of each aperture as by bolting. To afford adjustment, the bolt receiving apertures in the masking elements are in the form of slots, and loosening of the mounting bolts will permit limited lateral adjustment. If a greater degree of lateral adjustment is desired the mounting bolts may be removed and placed in any one of a spaced series of holes 87 which are provided in the panels 82 and 83. A vertically extending flange 88 (Figs. 3, 4 and 5) is formed integral with each of the masking elements 84 and 86. The flanges 88 are provided with transversely aligned apertures which serve to mount the harvested material guide ducts 91 and 92, as will be described hereinbelow.

From the above description it will be apparent that the mobile support 2 supports a pair of cotton harvesting units 7 and 8 for vertical up and down movement. Each unit supports an individual harvested material elevating device including the blower 28 and its outlet spout 49. The receptacle or basket 4 is pivotally mounted on the support for selective adjustment to a loading position in which the inlet apertures in the basket are in spaced registry or alignment with the outlet spouts 49 and to a tilted unloading position which presents the inlet apertures in nonregistering relation to the outlet spouts 49. A separable connection, operatively associated with the basket 4, is provided for bridging this space between the outlet spouts 49 and basket inlet apertures, and includes the above mentioned guide ducts 91 and 92.

As these ducts are of identical construction only the right hand duct 91, as viewed in Fig. 1, will be described. The duct 91 is generally elbow shaped and formed out of a suitable material such as sheet metal. The duct comprises a generally rectangular hood element 93 having a pair of open ends, one open end 94 (Fig. 4) being adapted to register with the inlet aperture in the side panel 82. The top wall 96 of the hood 93 curves gradually downward to form the forward wall 97 of a generally rectangular three sided conduit element 98 which is integral with the other end of hood 93. The inner and outer sides 99 and 101 (Fig. 1) of the conduit 98 are integral with forward wall 97 and join at their upward ends with the side walls 102 and 103 of the hood 93. The free edges of the side walls 99 and 101 which define the open or relieved side of the conduit 98 are flared outwardly as at 104 to stiffen the conduit and to aid in positioning the conduit in overlapping material guiding relation to the outlet spout 49.

Rigidly mounted on the hood side walls 102 and 103 as by bolting are a pair of transversely aligned rectangular shaped duct mounting brackets 106 and 107. The brackets are provided with a pair of apertures in transverse alignment with each other. In assembly the hood 93 is slipped into place between the flanges 88 and pivotally mounted thereon by a pin 108 which passes through apertures in flanges 88 and the pair of aligned apertures in brackets 106 and 107.

The duct assembly is completed by a panel 109 (Figs. 1, 3 and 4) which is yieldably or pivotally mounted at 111 adjacent its upper end between the side walls 99 and 101 of the conduit 98. Referring to Fig. 3, the bottom wall 112 of the hood 93 has the forward edge thereof flanged to form a stop 113 which serves to limit swinging movement of panel 109 about the pivot 111. The panel 109 is biased into closing relation to the open side of conduit 98 by resilient means in the form of a first spring 114, as shown in Fig. 3. The spring 114 has one end mounted on the bottom wall 112 of the duct hood 93 and has its other end secured to the panel 109 at a point above the pivot 111. Means for automatically pivoting panel 109 to an open position as duct 91 is raised includes a second spring 116 which has one end mounted on the receptacle 4 and its other end operatively connected to panel 109 below pivot 111 through the provision of a link chain 117. The second spring 116 and chain 117 serve to restrain the panel 109 as the duct 91 is elevated. This restraining movement causes the panel 109 to pivot to an open position, as shown in Fig. 4, during separation of the guide duct 91 from spout 49 in a manner which will be more fully explained hereinbelow.

Referring to Fig. 2 the reference character 118 indicates generally the means for selectively positioning and retaining the guide duct structures 91 and 92 in bridging relation between the conveyer spout 49 and basket 4, and for moving them in a locked nonbridging position which will permit the basket 4 to be tilted to an unloading position. A rock shaft 119 is rotatably mounted on the receptacle in spaced parallel relation to the pivot axis of ducts 91 and 92 by means of a pair of transversely spaced brackets 121 and 122 which are fixedly mounted on the vertical basket angles 61 and 62. A pair of lift or lever arms 123 and 124, Figs. 2 and 4, are fixedly mounted at opposite ends of the rock shaft 119. Means for actuating rock shaft 119 and lever arms 123 and 124 comprises a hand lever 126 which is secured to the rock shaft 119 adjacent lever 123 in convenient proximity to the operator's station 11. As shown in Fig. 3, the lever 126 and the lift or lever arms 123 and 124 are so arranged to form a bell crank structure pivotable about the axis of rock shaft 119.

A thrust transmitting element or link 127 is operatively associated between one arm 123 of the bell crank lever and the other end of link 127 is slotted as at 129 (Figs. 3 and 4) and pivotally mounted by a pin 132 on the hood mounting bracket 107, pin 132 extending in spaced parallel relation to the mounting axis of the hood 93. A second link 128, having a slotted end 131, is mounted in a similar manner between lever arm 124 and duct 92 by means of a pin 133. Resilient means in the form of a counterbalance spring 134 has one end connected to basket angle iron 64 (Fig. 3). The other end of spring 134 is connected to a dog leg shaped anchor rod 136 pivotally mounted on the other or hand lever 126 of the bell crank in radially spaced relation to the rock shaft 119. The special configuration of anchor rod 136 is provided so that when the hand lever 126 is in the lowered position, as shown in Fig. 3, the line of action of spring 134, indicated by line A, is moved to the right of the rock shaft pivot center. In this condition the spring 134 locks the ducts 91 and 92 in a bridging position.

As shown in Fig. 3, the rod 136 is not yet in contact with the rock shaft 119 and the link 127 has moved downward until pin 132 is at the top of the slot in bracket 135. In this position the spring 134 is constantly urging the duct and conduit element 98 into engagement with spout 49, and this engagement serves as a stop position for downward movement of the conduit. At the same time the panel spring 114, secured to an upper portion of the panel 109, is urging the latter into closing relation with the conveyer spout 49. It is apparent that the action of panel spring 114 is counter to spring 134, that is, spring 134 is constantly urging the conduit into embracing relation with spout 49 from one direction as the spring 114 constantly urges the panel into snugly fitting relation with the spout 49 from the other direction.

Figure 5:
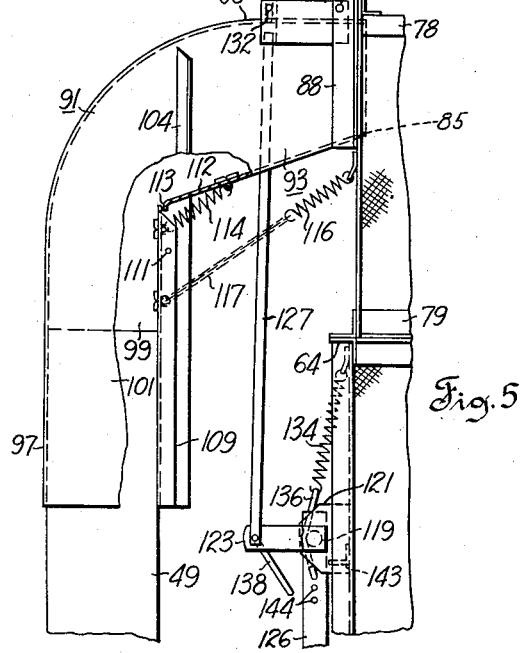
Fig. 5 is an enlarged partial side view of the cotton harvester shown in Fig. 2 with parts broken away and shown in section, and showing a modified arrangement of the conveying structure.

A modified arrangement is shown in Fig. 5 wherein the guide duct raising linkage is not constantly biasing the conduit into engagement with spout 49. This may be accomplished by lengthening the link 127 slightly so that pin 132 rides in a midposition in the slot 129. In this arrangement the contact of anchor rod 136 with the rock shaft 119 serves as a limit for downward movement of lever 126. In this position no tension from the spring 134 is being applied to the ducts as the top of the slot 129 is not in contact with the pin 132. It will be understood that in this arrangement the weight of the ducts 91 and 92 will serve to keep them in an operative position. In both modifications the panel 109 is positively biased into contact with the spout 49.

During the picking operation the units 7 and 8 may raise and lower slightly in following the contour of the ground. This raising and lowering is accommodated by the overlapping or telescoping arrangement of the spout 49 within the conduit 98 which permits the spout to slide up or down within the conduit when the unit raises or lowers.

The guide duct raising structure 118 is interconnected with a three way hydraulic valve 137 (Fig. 2). A depending link 138 is connected at its respective ends with the lever arm 124 and with one arm of a bell crank 139 mounted on the basket floor 53. The other arm of bell crank 139 is connected by a transverse rod 141 to the control arm 142 of the valve 137. Raising of lever 126 will pivot bell crank 139 to move control arm 142 in a counterclockwise direction, as viewed in Fig. 2, thereby shifting the three way hydraulic control valve so that the basket ram 6 is in communication with the hydraulic pump (not shown) which can then be safely operated to raise the basket.

In actuating the guide ducts to a nonbridging position initial raising of the lever arm 126 will move the line of action of counterbalance spring 134 overcenter of the rock shaft pivot 119 so that the spring may aid in the raising of the ducts 91 and 92. Further movement of the lever arms 123, 124 will move links or thrust transmitting elements 127 and 128 in an upward direction to initiate the upward swinging movement of the ducts 91 and 92 about their pivotal mountings. As the ducts are elevated, the upward movement of lever 124 is transmitted through link 138 to simultaneously and automatically adjust the three way valve 137 to a position placing the hydraulic pump in communication with the basket ram 6. In addition, as the ducts pivot upward, the spring 116 and chain 117 exert a pull against the biasing action of panel closing spring 114 to restrain and pivot the panel 109 to the open position illustrated in Fig. 4, wherein the panel will clear the top of the conveyer spout 49 regardless of the adjusted height of the harvesting units.

Upward movement of the hand lever 126 continues until it reaches the maximum position shown in dotted lines in Fig. 4. When this position is reached the line of action of link 127, line B, has passed overcenter of the rock shaft pivot and the weight of the ducts 91 and 92 on lever arms 123 and 124 will tend to cause further upward movement of hand lever 126. Further movement of hand lever 126 is, however, limited by a stop member 143 secured to the rock shaft bracket 121. It will be apparent that when the line of action of the link 127, indicated by line B (Fig. 4), passes overcenter of the rock shaft pivot 119 the entire weight of the duct structure combines with the tension of spring 134 to press the end of lever 126 against stop 143 to lock the hand lever 126 and ducts 91 and 92 in a raised nonbridging position. This automatic locking action will prevent any accidental lowering of the duct structure due to vibration or the like as the basket is unloaded.

The hydraulic pump is then actuated to elevate the basket and the cotton is discharged over the floor extension 68 by the action of the raddle conveyer 54. The basket is then lowered to the loading position whereupon downward movement of the hand lever 126 places the ducts 91 and 92 in bridging relation with the conveyer spouts 43.

From the above description it will be appreciated that a single actuating linkage 118 is provided for elevating the dual duct structures 91 and 92. The raising and lowering of the ducts may be effected without an exercise of undue lifting force by the operator as the counterbalance spring 134 aids in lifting movement. If a greater degree of counterbalance is desired it is only necessary to extend the spring slightly and anchor the rod 136 in any desired one of the spaced series of holes 144 provided in lever 126.

It should be understood that it is not intended to limit the invention to the particular form and details herein shown and described, and that the invention includes such other forms and modifications as are embraced by the appended claims.

What is claimed is:

1. A harvester comprising a mobile support; a harvesting unit mounted on said support and having a harvested material elevating device presenting an outlet aperture; a receptacle having a material inlet aperture; means pivotally mounting said receptacle on said support for selective adjustment to a loading position in which said inlet is in spaced registry with said outlet, and to a tilted unloading position presenting said inlet in nonregistering relation to said outlet; a harvested material guide duct pivotally mounted on said receptacle for movement into and out of harvested material transporting relation between said outlet and inlet apertures, and means operatively interposed between said receptacle and duct for selectively positioning the latter in material transporting relation between said outlet and inlet apertures when said receptacle is in said loading position and to a remote, nontransporting position prior to moving said receptacle to said tilted unloading position.

2. A harvester comprising a mobile support; a harvesting unit mounted on said support and having a harvested material elevating device presenting an outlet spout; a receptacle having a material inlet aperture; means pivotally mounting said receptacle on said support for selective adjustment to a loading position in which said inlet is in spaced registry with said outlet spout, and to a tilted unloading position presenting said inlet in nonregistering relation to said outlet; a harvested material guide duct having a pair of open ends, said duct pivotally mounted on said receptacle to present one of said ends in registry with said inlet aperture and having one side relieved adjacent the other end thereof to afford positioning in overlapping material guiding relation to said outlet spout, and means operatively interposed between said receptacle and said duct for selectively positioning said duct in nonbridging and bridging relation between said outlet spout and receptacle.

3. The harvester, as set forth in claim 2, wherein said means for selectively positioning said duct includes a resilient means operatively interposed between said duct and said receptacle for constantly urging said duct into engagement with said spout when the former is in a loading position, and for aiding movement of said duct to a nonbridging position.

4. A harvester comprising a mobile support; a harvesting unit mounted on said support and having a harvested material outlet spout; a receptacle having a material inlet aperture; means pivotally mounting said receptacle on said support for selective adjustment to a loading position in which said inlet is in spaced registry with said outlet spout, and to a tilted unloading position presenting said inlet in nonregistering relation to said outlet; and a harvested material guide duct comprising, a hood element pivotally mounted on said receptacle and having a pair of open ends, one of said ends being in registry with said inlet aperture, an open ended conduit element mounted on said hood adjacent the other open end thereof and having one side relieved to afford positioning in overlapping material guiding relation to said outlet spout, a panel pivotally mounted on said duct in closing relation to said relieved side of said conduit, and means operatively interposed between said receptacle and said duct for selectively positioning and retaining said duct in material transporting relation between said outlet spout and receptacle inlet when said receptacle is in a loading position and in a nonregistering position prior to moving said receptacle to said unloading position.

5. The harvester, as set forth in claim 4, wherein said means for selectively positioning and retaining said guide duct comprises, a double armed lever pivotally mounted on said receptacle in spaced relation to the pivot mounting of said duct member, a link element having one end mounted on one arm of said lever, the other end of said link operatively associated with said duct member at a point radially spaced from the pivotal mounting of the latter on said receptacle whereby movement of the other arm of said lever in one direction will move said duct to a nonregistering position wherein said link is positioned in a locked position at one side of said lever pivot, and whereby movement of said other lever arm in the other direction will move said link overcenter of said lever pivot and place said duct in registry with said spout.

6. In a harvester of the type having a mobile support; a harvesting unit mounted on said support having a harvested material outlet spout; a receptacle having a material inlet aperture; means pivotally mounting said receptacle on said support for selective adjustment to a loading position in which said inlet is in spaced registry with said outlet spout, and to a tilted unloading position presenting said inlet in nonregistering relation to said outlet spout; the combination of a harvested material guide duct selectively positionable in bridging and nonbridging relation between said receptacle and outlet spout comprising, a hood element having a pair of open ends, said hood pivotally mounted on said receptacle for swinging movement placing one of said ends into registry with said inlet aperture, an open ended conduit element mounted on said hood adjacent the other of said open ends and having one side relieved to afford positioning in overlapping material guiding relation to said outlet spout, a panel yieldably mounted on said duct in closing relation to said relieved side of said conduit, resilient means operatively mounted on said duct for biasing said panel to a closed position, and means operatively interposed between said panel and said receptacle for pivoting said panel to an open position as said guide duct is moved to a nonbridging position.

7. A harvester comprising a mobile support, a harvesting unit mounted on said support having a harvested material elevating device presenting an outlet spout; a receptacle having a material inlet aperture; means pivotally mounting said receptacle on said support for selective adjustment to a loading position in which said inlet is in spaced registry with said outlet spout, and to a tilted unloading position presenting said inlet in nonregistering relation to said outlet spout; and a harvested material guide duct selectively positionable in bridging and nonbridging relation between said receptacle and outlet spout, said duct comprising a hood element pivotally mounted on said receptacle for swinging movement into registry with said inlet aperture, an open ended conduit element mounted on said hood and having one side relieved to afford positioning in overlapping material guiding relation to said outlet spout, a panel pivotally mounted on said duct in closing relation to said relieved side of said conduit, a first spring operatively associated between said duct and said panel for resiliently biasing said panel to a closed position, and a second spring operatively mounted between said receptacle and said panel for pivoting said panel to an open position as said guide duct is moved to a nonbridging position.

8. A harvester comprising a mobile support, a harvesting unit mounted on said support and having a harvested material elevating device presenting an outlet spout; a receptacle having a material inlet aperture; means pivotally mounting said receptacle on said support for selective adjustment to a loading position in which said inlet is in spaced registry with said outlet spout, and to a tilted unloading position presenting said inlet in nonregistering relation to said outlet spout; a harvested material guide duct mounted on said receptacle and positionable in bridging and nonbridging relation between said receptacle and outlet spout, said duct comprising a hood element having a pair of open ends, said hood pivotally mounted on said receptacle for swinging movement placing one of its ends into registry with said inlet aperture, an open ended conduit element mounted on said hood adjacent the other of said ends and having one side relieved to afford positioning in overlapping material guiding relation to said outlet spout, a panel pivotally mounted on said duct in closing relation to said relieved side of said conduit, a first spring mounted between said duct and said panel at one side of said panel pivot for resiliently biasing said panel to a closed position against one side of said spout, a second spring operatively associated between said receptacle and said panel at the other side said panel pivot for moving said panel to an open position as said guide duct is moved to a nonbridging position, and means operatively interposed between said receptacle and said duct for maintaining said duct in nonbridging and bridging positions including a counterbalance spring constantly urging said conduit against the other side of said spout when said duct is in a bridging position.

9. In a harvester of the type having a mobile support; a harvesting unit mounted on said support having a harvester material outlet spout; a receptacle having a material inlet aperture, means pivotally mounting said receptacle on said support for selective adjustment to a loading position in which said inlet is in spaced registry with said outlet spout, and to a tilted unloading position presenting said inlet in nonregistering relation to said outlet spout; the combination of a harvester material guide duct selectively positionable in bridging and nonbridging relation between said receptacle and outlet spout comprising, a hood element having a pair of open ends, said hood pivotally mounted on said receptacle and having one of said ends in registry with said inlet aperture, an open ended conduit element mounted on said hood adjacent the other end thereof and having one side relieved to afford positioning in overlapping material guiding relation to said outlet spout, a panel yieldably mounted on said duct in closing relation to said relieved side of said conduit, resilient means operatively mounted on said duct for biasing said panel to a closed position, means operatively interposed between said panel and said receptacle for pivoting said panel to an open position as said guide duct is moved to a nonbridging position; and means operatively interposed between said duct and said receptacle for selectively positioning and retaining said guide duct in bridging and nonbridging positions including a bell crank pivotally mounted on said receptacle in spaced relation to the pivot mounting of said duct member, a link member having one end mounted on one of the arms of said bell crank, the other end of said link operatively associated in thrust transmitting relation with said duct member at a point thereon in radially spaced relation to the pivotal mounting of said duct on said receptacle, and a counterbalance spring having one end mounted on said receptacle and having its other end mounted on the other arm of said bell crank to thereby aid pivotal movement of said bell crank lever in link raising direction.

10. A harvester comprising a mobile support, a harvesting unit mounted on said support and having a harvested material outlet spout; a receptacle having a material inlet aperture; means pivotally mounting said receptacle on said support for selective adjustment to a leading position in which said inlet is in spaced registry with said outlet spout and to a tilted unloading position presenting said inlet in nonregistering relation to said outlet spout; a harvested material guide duct including, a hood element having a pair of open ends, said hood pivotally mounted on said receptacle and having one end thereof in registry with said inlet aperture, an open ended conduit element mounted on said hood adjacent the other end thereof and having one side relieved to afford positioning in overlapping material guiding relation to said outlet spout, a panel yieldably mounted on said duct in closing relation to said relieved side; means operatively interposed between said duct and receptacle for selectively positioning and maintaining said duct in bridging and nonbridging relation between said spout and receptacle including a bell crank pivotally mounted on said receptacle in radially spaced relation to the pivot mounting of said duct member, a thrust transmitting element having one end mounted on one arm of said bell crank, the other end of said thrust transmitting element operatively connected with said duct member at a point thereon in radially spaced relation to the pivotal mounting of said duct on said receptacle, whereby movement of said bell crank and thrust transmitting element in one direction will move said duct to a nonbridging position wherein said thrust transmitting element is moved to a locked position on one side of said bell crank pivot, and movement of said bell crank in the other direction will move said link to the other side of said bell crank pivot and position said duct in bridging relation with said spout, and resilient means operatively interposed between said bell crank and receptacle for urging said bell crank in said nonbridging direction.

11. In a harvester of the type having a mobile support; a harvesting unit mounted on said support and having a harvested material outlet spout; a receptacle having a material inlet aperture, means pivotally mounting said receptacle on said support for selective adjustment to a loading position in which said inlet is in spaced registry with said outlet spout, and to a tilted unloading position presenting said inlet in nonregistering relation to said outlet spout; the combination of a harvested material guide duct selectively positionable in bridging and nonbridging relation between said receptacle and outlet spout; said duct comprising a hood element having a pair of open ends, a hood pivotally mounted on said receptacle and having one end thereof in registry with said inlet aperture, an open ended conduit element mounted on said hood adjacent the other end thereof and having one side relieved to afford positioning in overlapping material guiding relation to said outlet spout, and means operatively interposed between said duct and receptacle for selectively positioning and maintaining said duct in bridging and nonbridging positions including a double armed lever pivotally mounted on said receptacle in spaced relation to the pivotal mounting of said duct, a thrust transmitting element operatively mounted between one arm of said lever and said duct at a point spaced from the pivotal mounting of the latter, resilient means operatively connected between said receptacle and the other arm of said lever in overcenter relation to said lever pivot to thereby lock said lever and duct in a bridging position and whereby initial movement of said lever in a duct raising direction will move said resilient means overcenter of said lever pivot to aid nonbridging movement of said duct, movement of said thrust transmitting element continuing until the point of pivotal mounting of the latter on said one arm passes overcenter of said lever pivot to a limit position maintaining said duct in a nonbridging position.

12. A harvester comprising a mobile support, a pair of harvesting units mounted on said support, each having a harvested material elevating device presenting an outlet spout; a receptacle having a pair of material inlet apertures; means pivotally mounting said receptacle on said support for selective adjustment to a loading position in which said inlet apertures are in spaced registry with said outlet spouts, and to a tilted unloading position presenting said inlet apertures in nonregistering relation to said outlet spouts; and harvested material guide means for bridging the space between said spouts and receptacle inlets when said receptacle is in said loading position comprising: a pair of harvested material guide ducts each pivotally mounted on said receptacle for registry with its respective inlet aperture and having one side relieved to afford positioning in overlapping material guiding relation with its respective outlet spout, and means operatively interposed between said receptacle and said ducts for positioning and retaining said ducts in a bridging relation between said spouts and receptacle when the latter is in a loading position and in a remote nonbridging position prior to tilting said receptacle to a nonloading position.

13. The harvester, as set forth in claim 12, wherein said means for simultaneously positioning and retaining said guide ducts comprises a rock shaft pivotally mounted on said receptacle in radially spaced relation to the pivot mounting of said guide ducts and having a pair of lever arms thereon, a pair of link elements connected, respectively, with said lever arms and with said guide ducts at a point thereon in radially spaced relation to the pivotal mounting of each respective duct on said receptacle, means operatively mounted on said rock shaft for pivoting said rock shaft and lever arms in one direction to raise said ducts to a nonbridging position in which the pivot centers of said links on their respective lever arms are in a locked position overcenter of said rock shaft pivot, and in the other direction to lower said ducts into a bridging relation with said spouts, and stop means mounted on said receptacle for limiting movement of said rock shaft in said one direction.

14. A harvester comprising a mobile support, a pair of harvesting units mounted on said support, each having a harvested material elevating device presenting an outlet spout; a receptacle having a pair of material inlet apertures; means pivotally mounting said receptacle on said support for selective adjustment to a loading position in which said inlet apertures are in spaced registry with said outlet spouts, and to a tilted unloading position presenting said inlet apertures in nonregistering relation to said outlet spouts; and harvested material guide means for bridging the space between said spouts and receptacle apertures comprising a pair of harvested material guide ducts each including an open ended hood element pivotally mounted on said receptacle and having one end in registry with one of said inlet apertures, an open ended conduit element mounted on said hood adjacent the other end thereof and having one side removed to afford positioning in embracing relation with its registering outlet spout, a panel yieldably mounted on each of said ducts and biased into closing relation to said open side of each respective conduit, means operatively interconnecting said receptacle and each of said panels for pivoting said panels to an open position in response to movement of said ducts to a nonbridging position, and means for positioning and retaining said guide ducts in bridging and nonbridging positions including a rock shaft pivotally mounted on said receptacle on an axis in radially spaced parallel relation to the pivot mounting of said guide ducts and having a pair of lift arms thereon, a pair of link elements connected, respectively, with said lift arms and with said guide ducts at a point thereon in radially spaced relation to the pivotal mounting of each respective duct, an actuating lever mounted on said rock shaft, a counterbalance spring mounted between said receptacle and said actuating lever, said spring having a line of action at one side of said rock shaft axis when said duct is in a bridging position to bias said lever in a duct lowering direction, and stop means mounted on said receptacle for limiting movement of said lever in said one direction, movement of said lever in a duct raising direction moving said line of action of said spring to the other side of said rock shaft axis wherein said spring will bias said lever in said duct raising direction.

15. A harvester comprising a support, a harvesting unit mounted on said support, a receptacle pivotally mounted on said support for tilting movement to raised and lowered positions, conveying means mounted on said unit including an outlet spout, a guide duct pivotally mounted on said receptacle in material delivering relation thereto, said duct having one side relieved for overlapping bridging relation with said spout, means operatively interposed between said receptacle and said duct for pivoting the latter to a nonbridging position, a panel pivotally mounted on said duct for movement to open and closed positions relative to said relieved side, resilient means operatively mounted on said duct for urging said panel into said closing relation, and means operatively interposed between said reecptacle and said panel for automatically pivoting the latter to said open position clearing said spout as said duct is pivoted to a nonbridging position.

16. A separable connection for use with a conveying mechanism of the type having a support, a conveying means mounted on said support including a rectangular outlet spout, and a receptacle pivotally mounted on said support for tilting movement to loading and unloading positions comprising: a harvested material guide duct positionable in bridging and nonbridging relation between said outlet spout and receptacle, including a hood element having a pair of open ends, said hood pivotally mounted on said receptacle and having one of said ends in discharge relation thereto, a conduit element mounted adjacent the other end of said hood and having spaced side members connected by an end wall, said conduit element positioned in embracing relation to three sides of said outlet spout, a panel yieldably mounted between said spaced side members in closing relation to the fourth side of said spout, resilient means mounted on said duct and panel for biasing the latter into contact with said fourth side of the spout, means operatively interposed between said receptacle and said duct for moving said guide duct to said nonbridging position, and means interposed between said panel and receptacle and operative in response to said guide duct movement for simultaneously moving said panel to an open position.

17. In a harvester of the type comprising a support having a harvesting unit mounted thereon, a mounted receptacle on said support for tilting movement to a lowered loading position and to a raised unloading position, conveying means mounted on said unit including an outlet spout; the combination of a tubular guide duct pivotally mounted on said receptacle in material delivering relation thereto and selectively movable to bridging and nonbridging positions between said spout and receptacle, said duct having one side relieved for overlapping registry with said spout, a panel mounted on said duct for pivotal movement into closing relation to said relieved side, resilient means operatively mounted between said duct and said panel at a point on the latter radially offset from one side of said panel pivot for urging said panel into engagement with said spout, and means operatively associated between said panel and said receptacle at the other side of said panel pivot for automatically moving said panel to an open position clearing said spout as said duct is pivoted to a nonbridging position.

18. A separable connection for use with a conveying structure of the type having a support, a blower mounted on said support and having an outlet spout, a receptacle having an inlet aperture, means pivotally mounting said receptacle on said support for selective adjustment to a loading position in which said inlet is in spaced registry with said outlet spout and to a tilted unloading position presenting said inlet aperture in nonregistering relation to said outlet spout comprising: a hood element pivotally mounted on said support in registry with said receptacle inlet and presenting an open ended conduit element having one side relieved to afford positioning in overlapping bridging relation to said outlet spout, a panel pivotally mounted on said conduit, a first spring mounted on said panel for biasing the latter into engagement with one side of said outlet spout, and means operatively interposed between said hood and said receptacle for selectively positioning said hood and conduit in nonbridging and bridging positions including a second spring mounted on said receptacle for constantly urging said conduit into engagement with the other side of said spout when said conduit is in a bridging position.

References Cited in the file of this patent

UNITED STATES PATENTS

| | | |
|---|---|---|
| 2,518,465 | Hagen et al. | Aug. 15, 1950 |
| 2,558,951 | Hagen et al. | July 3, 1951 |
| 2,671,298 | Fergason | Mar. 9, 1954 |
| 2,697,005 | Hagen et al. | Dec. 14, 1954 |